United States Patent
Mizikovsky et al.

(10) Patent No.: US 8,526,914 B2
(45) Date of Patent: Sep. 3, 2013

(54) SELF-SYNCHRONIZING AUTHENTICATION AND KEY AGREEMENT PROTOCOL

(75) Inventors: Semyon B. Mizikovsky, Morganville, NJ (US); Michael Marcovici, Wheaton, IL (US)

(73) Assignee: Alcatel Lucent, Paris (FR)

( * ) Notice: Subject to any disclaimer, the term of this patent is extended or adjusted under 35 U.S.C. 154(b) by 1607 days.

(21) Appl. No.: 10/861,895

(22) Filed: Jun. 4, 2004

(65) Prior Publication Data
US 2005/0272406 A1    Dec. 8, 2005

(51) Int. Cl.
*H04M 1/66* (2006.01)

(52) U.S. Cl.
USPC ........... 455/411; 455/410; 455/433; 380/248; 380/282

(58) Field of Classification Search
USPC .................. 455/432.1–435.3, 445, 410–411, 455/502, 418–420; 380/247, 249, 273; 713/169–170
See application file for complete search history.

(56) References Cited

U.S. PATENT DOCUMENTS

| | | | | |
|---|---|---|---|---|
| 5,148,007 A * | 9/1992 | Kruse | ........................... | 235/382 |
| 5,241,598 A * | 8/1993 | Raith | ........................... | 380/248 |
| 5,329,573 A * | 7/1994 | Chang et al. | ........................... | 455/411 |
| 5,455,863 A * | 10/1995 | Brown et al. | ........................... | 380/247 |
| 5,524,135 A * | 6/1996 | Mizikovsky et al. | ........................... | 455/419 |
| 5,661,806 A * | 8/1997 | Nevoux et al. | ........................... | 380/247 |
| 5,884,158 A * | 3/1999 | Ryan et al. | ........................... | 455/410 |
| 5,940,512 A * | 8/1999 | Tomoike | ........................... | 380/248 |
| 6,101,380 A * | 8/2000 | Sollee | ........................... | 455/411 |
| 6,591,364 B1 * | 7/2003 | Patel | ........................... | 713/170 |
| 6,839,553 B2 * | 1/2005 | Park | ........................... | 455/411 |
| 6,980,796 B1 * | 12/2005 | Cuellar et al. | ........................... | 455/410 |
| 7,127,234 B2 * | 10/2006 | Ishii | ........................... | 455/411 |
| 7,130,613 B2 * | 10/2006 | Carey et al. | ........................... | 455/411 |
| 7,131,006 B1 * | 10/2006 | Carroll | ........................... | 713/171 |
| 7,315,740 B2 * | 1/2008 | Maes | ........................... | 455/432.1 |
| 7,571,471 B2 * | 8/2009 | Sandhu et al. | ........................... | 726/17 |
| 7,610,039 B2 * | 10/2009 | Kim | ........................... | 455/410 |
| 7,734,911 B2 * | 6/2010 | Ganesan et al. | ........................... | 713/155 |
| 7,787,863 B2 * | 8/2010 | van de Groenendaal | ..... | 455/411 |
| 7,933,584 B2 * | 4/2011 | Ji et al. | ........................... | 455/411 |
| 7,970,380 B2 * | 6/2011 | Laitinen | ........................... | 455/411 |
| 8,131,293 B2 * | 3/2012 | Dutta | ........................... | 455/435.1 |
| 8,275,355 B2 * | 9/2012 | Huang et al. | ........................... | 455/410 |
| 2004/0131185 A1 * | 7/2004 | Kakumer | ........................... | 380/247 |
| 2004/0198220 A1 * | 10/2004 | Whelan et al. | ........................... | 455/41.1 |
| 2005/0078824 A1 * | 4/2005 | Malinen et al. | ........................... | 380/247 |
| 2005/0138355 A1 * | 6/2005 | Chen et al. | ........................... | 713/155 |

FOREIGN PATENT DOCUMENTS

EP    1168870 A1 *    1/2002

OTHER PUBLICATIONS

International European Search Report (EP 05 25 3185) dated Aug. 10, 2005.

* cited by examiner

*Primary Examiner* — Sharad Rampuria
(74) *Attorney, Agent, or Firm* — Williams, Morgan & Amerson

(57) ABSTRACT

The present invention provides a method of wireless communication with at least one mobile unit and at least one authentication center in a wireless telecommunications network. The method includes generating at least one access request based upon at least one first sequence number associated with the mobile unit and receiving at least one message formed based upon the access request, the message including at least one second sequence number associated with the authentication center, the second sequence number selected to be acceptable to the mobile unit.

27 Claims, 3 Drawing Sheets

SELF-SYNCHRONIZING AUTHENTICATION AND KEY AGREEMENT PROTOCOL

BACKGROUND OF THE INVENTION

1. Field of the Invention

This invention relates generally to telecommunication systems, and, more particularly, to wireless communication systems.

2. Description of the Related Art

Wireless telecommunication systems, such as cellular telephone systems, are now capable of establishing and maintaining concurrent wireless communication links with millions of mobile units distributed within a large, and growing, fraction of the surface area of the earth. Moreover, a user may carry a single mobile unit to many locations within the country or even, in some cases, the world, and experience uninterrupted wireless telecommunication service. For example, a mobile unit registered to a service provider located in New Jersey may work just as well when used in Houston. To provide nearly transparent service to mobile units that move freely throughout a large geographic area, wireless telecommunication systems typically divide the geographic area into smaller areas, such as cells, which are linked by a wireless telecommunication network.

FIG. 1 conceptually illustrates a conventional wireless telecommunication network 100 that may establish one or more wireless telecommunication links with one or more mobile units 105(1-2) located in one or more of a plurality of cells 110(1-2). Each cell 110(1-2) includes a base station 115(1-2) that establishes and maintains concurrent wireless communication links with the one or more mobile units 105(1-2) located within the cell 110(1-2). Each of the base stations 115(1-2) is communicatively coupled to a mobile switching center 125(1-2). Typically, each mobile switching center 125(1-2) is associated with at least one of the cells 110(1-2) that provide service to a particular geographic area. For example, the mobile switching center 125(1) may be associated with the cell 110(1), which may cover a particular metropolitan area. The mobile switching centers 125(1-2) are communicatively coupled via a network 130, such as a Public Switched Telephone Network (PSTN), a plain old telephone system (POTS), an Integrated Services Domain Network (ISDN), a cellular network, a satellite network, and the like.

A visitor location register (VLR) 140(1-2) is associated with each mobile switching center 125(1-2). The visitor location registers 140(1-2) typically include information identifying each mobile unit 105(1-2) that is currently present within the associated cell 110(1-2). For example, the visitor location register 140(1) may include a list of both the "home" and/or "visitor" mobile units 105(1) that are present in the cell 110(1). The visitor location registers 140(1-2) are typically implemented in a server node, such as a Serving GPRS Support Node (SGSN). However, in the interest of clarity, the server node(s) including the visitor location registers 140(1-2) will be collectively referred to hereinafter as the visitor location registers 140(1-2).

A home location register (HLR) 135(1-2) is also associated with each mobile switching center 125(1-2). The home location registers 135(1-2) typically include information identifying the mobile units 105(1-2) that are associated with the mobile switching center 125(1-2). The home location registers 135(1-2) and the visitor location registers 140(1-2) are shown as separate functional blocks in FIG. 1. However, persons of ordinary skill in the art should appreciate that the home location registers 135(1-2) and/or the visitor location registers 140(1-2) may alternatively be incorporated within the mobile switching centers 125(1-2). Moreover, in some embodiments, portions of the home location registers 135(1-2) and the visitor location registers 140(1-2) may be combined into a single register.

In operation, a wireless telecommunication link is initiated when one of the mobile units 105(1) transmits an access request to one of the base stations 115(1). The access request typically includes information such as an identification number associated with the mobile unit 105(1), a signal indicative of one or more capabilities of the mobile unit 105(1), a signal indicative of one or more protocols followed by the mobile unit 105(1), and the like. The base station 115(1) then provides the access request to the associated mobile switching center 125(1), which stores information indicative of the mobile unit 105(1) in the visitor location register 135(1).

The mobile switching center 125(1) also accesses the home location register 140(1) to determine whether the mobile switching center 125(1) is the home mobile switching center of the mobile unit 105(1). If the mobile switching center 125(1) is not the home mobile switching center of the mobile unit 105(1), the mobile switching center 125(1) broadcasts a message to the network 130. The message may be used to determine that the mobile unit 105 is associated with one of the other mobile switching centers, e.g. the mobile switching center 125(2), by accessing the home location register 135(2) associated with the mobile switching center 125(2). Once the mobile unit 105(1) has been associated with the appropriate home mobile switching center 125(1-2), a wireless telecommunication link may be established.

The mobile switching centers 125(1-2) also include authentication centers (AuC) 145(1-2) that provide security services to the mobile units 105(1-2). The authentication centers 145(1-2) typically operate according to an Authentication and Key Agreement (AKA) protocol. For example, the authentication centers 145(1-2) may operate according to the Authentication and Key Agreement (AKA) protocol, a challenge-response mechanism using symmetric cryptography defined by the 3rd Generation Partnership Project (3GPP and 3GPP2) to ensure user identity confidentiality, user location confidentiality, and user untraceability. The authentication centers 145(1-2) are shown as separate functional blocks in FIG. 1. However, persons of ordinary skill in the art should appreciate that the authentication centers 145(1-2) may alternatively be incorporated within the mobile switching centers 125(1-2). Moreover, in some embodiments, portions of the home location registers 135(1-2) and/or the visitor location registers 140(1-2) may be included within the authentication centers 145(1-2).

The authentication centers 145(1-2) include a database of secure records associated with the mobile units 105(1-2). For example, each entry in the database may include a secret pre-provisioned root key, one or more cryptographic algorithms, one or more sequence numbers, and other information associated with each mobile units 105(1-2). The mobile units 105(1-2) also include security information corresponding to the information included in the secure record in the authentication centers 145(1-2). For example, a subscriber identity module (not shown in FIG. 1) in the mobile units 105(1-2) may include the secret pre-provisioned root key, one or more cryptographic algorithms, one or more sequence numbers, and other information associated with the mobile units 105(1-2). The subscriber identity module is sometimes referred to as a user services identity module (USIM).

In operation, the mobile unit 105(1) initiates a wireless telecommunication link by providing an access request to the visitor location register 140(1), which then provides an authentication data request to the authentication center 145

(1). The authentication center 145(1) generates an authentication center sequence number and a random number. One or more irreversible algorithmic functions are then used to generate quantities such as a message authentication code, an expected result, a cipher key, an integrity key, an anonymity key, and the like based upon the pre-provisioned root key, an authentication management field, the authentication center sequence number, and the random number. The authentication center 145(1) then forms an authentication token (AUTN) using the location register sequence number, the anonymity key, the authentication management field, and the message authentication code.

The authentication center 145(1) also forms one or more authentication vectors based upon the random number, the expected result, the cipher key, the integrity key, and the authentication token. The authentication center 145(1) provides an authentication data response including the authentication vectors to the visitor location register 140(1), which stores the authentication vectors. The visitor location register 140(1) selects one of the authentication vectors and provides it to the mobile unit 105(1) in the user authentication request. The mobile unit 105(1) validates the network by verifying the authentication token and then computes a result, which is provided to the visitor location register 140(1) in a user authentication response. The visitor location register 140(1) compares the result with the expected result and authenticates the mobile unit 105(1) if the result is equal to the expected result.

The Authenticity and Key Agreement protocol includes a replay protection mechanism to guarantee that the authentication vector is fresh and not repeated by a rogue network. This mechanism requires maintaining one or more sequence numbers in the mobile unit 105(1) that can be compared to one or more sequence numbers stored in the corresponding authentication center 145(1). The mobile unit 105(1) only accepts authentication tokens that include sequence numbers within a predetermined range. For example, if the mobile unit sequence number is equal to 300, the mobile unit 105(1) may only accept authentication tokens including authentication center sequence numbers in the range from 301 to 310.

If the mobile unit 105(1) receives an authentication vector with an unacceptable authentication center sequence number after the wireless telecommunication link is established, the mobile unit 105(1) assumes that the wireless telecommunication network 100 is out of synchronization and initiates a re-synchronization procedure. During the re-synchronization procedure, the current value of the mobile unit sequence number is provided to the visitor location register 140(1) in an authentication synchronizer (AUTS) parameter, which includes the integrity protection message authentication code computed by the mobile unit 105(1) and is masked from eavesdropping. The visitor location register 140(1) provides the AUTS parameter to the authentication center 145(1), which verifies that the message authentication code is valid. If the message authentication code is valid, the authentication center 145(1) resets the authentication center sequence number to a valid sequence number. For example, if the mobile unit sequence number is equal to 300, the authentication center 145(1) may reset the authentication sequence number to a randomly selected number in the range from 301 to 310.

Mis-synchronization, which may trigger the re-synchronization process described above, may occur on established wireless communication links when the mobile unit 105(1) roams from the cell 110(1) associated with the visitor location register 140(1) to the cell 110(2) associated with the visitor location register 140(2). For example, the mobile unit 105(1) may provide an access request to the visitor location register 140(1), which will then request one or more authentication vectors from the authentication center 145(1). The visitor location register 140(1) may then store the requested authentication vectors. The requested authentication vectors may include the authentication center sequence numbers in a range (such as 301 to 310). If the mobile unit 105(1) then roams to the cell 110(2), the visitor location register 140(2) will request a new set of authentication vectors from the authentication center 145(1) associated with the home location register 135(1) of the mobile unit 105(1). The newly requested authentication vectors may include authentication center sequence numbers in a new range (such as 311 to 320).

When the roaming mobile unit 105(1) receives the new authentication vector, the mobile unit 105(1) floats the mobile unit sequence number to correspond to the authentication center sequence number in the new authentication vector (such as 311). However, if the mobile unit 105(1) later returns to the cell 110(1), the visitor location register 140(1) may provide an old authentication vector having an unacceptable sequence number (such as a sequence number in the range from 301 to 310), which may result in mis-synchronization of the mobile unit 105(1) and the authentication center 145(1). Because of the large number of roaming mobile units 105(1-2) typically served by each authentication center 145(1-2), mis-synchronizations are likely to be common in wireless telecommunication networks operating according to the Authentication and Key Agreement protocol, and resynchronization procedures will be correspondingly frequent. The numerous resynchronization procedures may strain network resources and undesirably prolong the authentication cycle.

The present invention is directed to addressing the effects of one or more of the problems set forth above.

SUMMARY OF THE INVENTION

In one embodiment of the instant invention, a method is provided for wireless communication with at least one mobile unit and at least one authentication center. The method includes generating at least one access request based upon at least one first sequence number associated with the mobile unit and receiving at least one message formed based upon the access request, the message including at least one second sequence number associated with the authentication center, the second sequence number selected to be acceptable to the mobile unit.

In another embodiment of the present invention, a method is provided for wireless communication with at least one mobile unit and at least one authentication center in a wireless telecommunication network. The method includes receiving at least one access request formed based upon at least one first sequence number associated with the mobile unit and providing at least one message based upon the access request, the message including a second sequence number associated with the authentication center and the second sequence number selected to be acceptable to the mobile unit.

In yet another embodiment of the present invention, a method is provided for wireless communications with at least one mobile unit and at least one authentication center in a wireless telecommunication network. The method includes receiving at least one access request formed based upon at least one first sequence number associated with the mobile unit and providing at least one first message formed based upon the access request. The method also includes receiving, in response to providing the first message, at least one second message including at least one second sequence number associated with the authentication center, the second sequence number selected to be acceptable to the mobile unit.

BRIEF DESCRIPTION OF THE DRAWINGS

The invention may be understood by reference to the following description taken in conjunction with the accompanying drawings, in which like reference numerals identify like elements, and in which.

Figure 1:
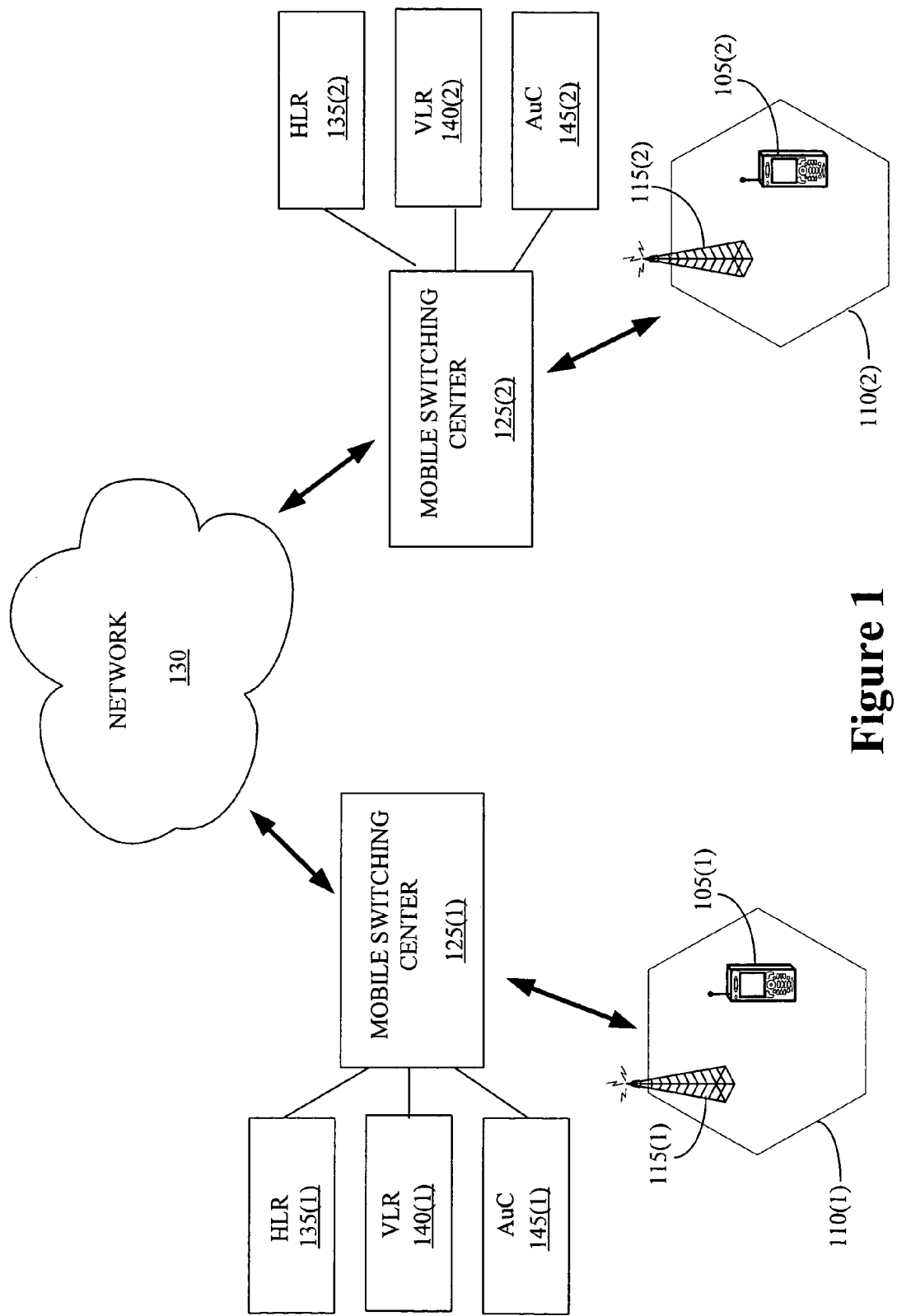
FIG. 1 conceptually illustrates a conventional wireless telecommunication network that may establish one or more wireless telecommunication links with one or more mobile units located in one or more of a plurality of cells.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
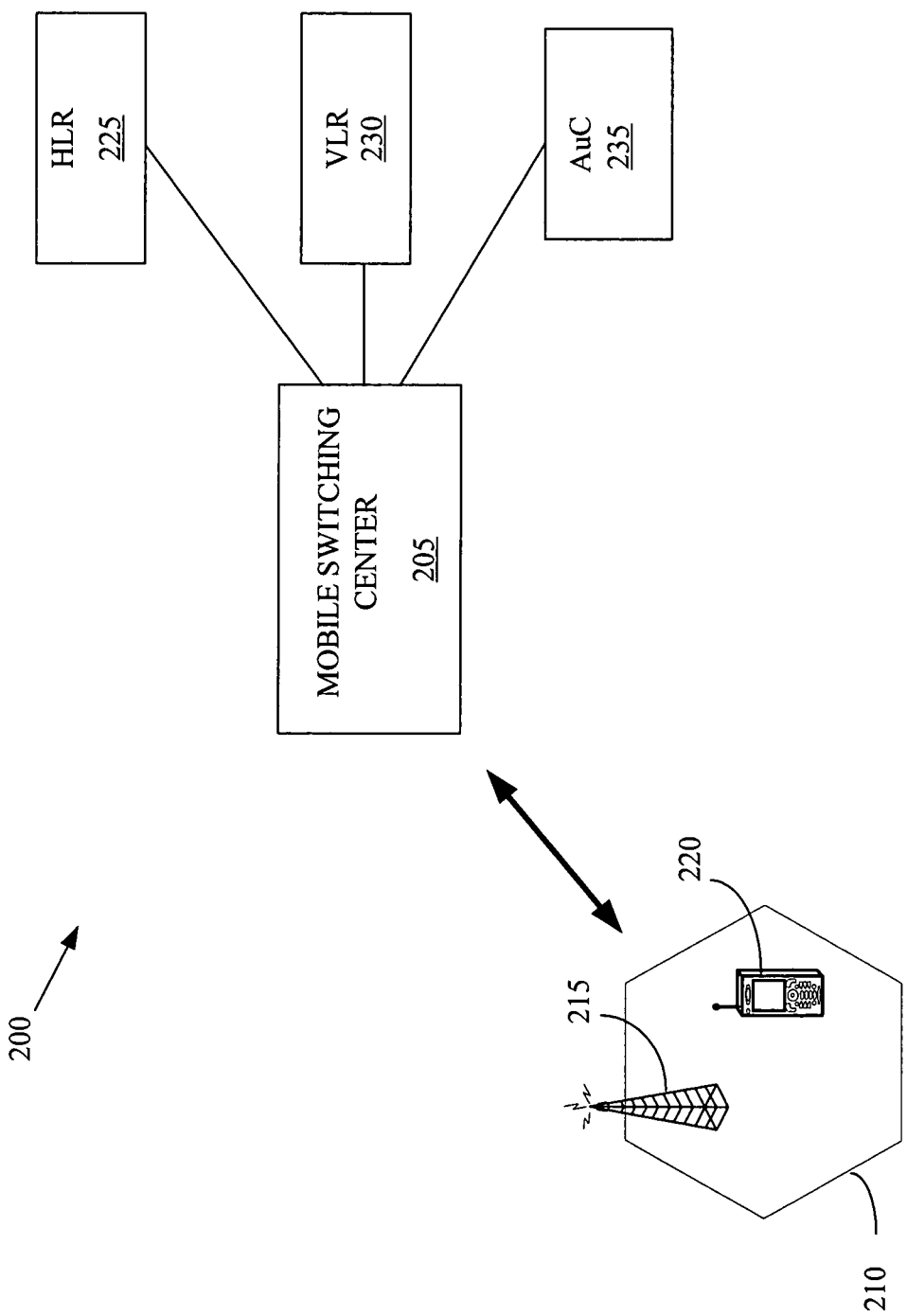
FIG. 2 conceptually illustrates an exemplary embodiment of a portion of a wireless telecommunication network, in accordance with the present invention.

FIG. 2 conceptually illustrates an exemplary embodiment of a portion of a wireless telecommunication network 200. In the illustrated embodiment, a mobile switching center 205 provides wireless telecommunication services to at least one cell 210 using at least one associated base station 215. In the interest of clarity, only one mobile switching center 205, one cell 210, and one associated base station 215 are depicted in FIG. 2. However, persons of ordinary skill in the art should appreciate that the present invention is not so limited. In alternative embodiments, the wireless telecommunication network 200 may include any desirable number of mobile switching centers 205 serving any desirable number of cells 210 using any desirable number of associated base stations 215. Furthermore, although the various elements of the wireless telecommunication network 200 are depicted as separate functional blocks, persons of ordinary skill in the art should appreciate that portions of these functional blocks may be combined as desired.

The wireless telecommunication network 200 includes at least one mobile unit 220. The mobile unit 220 maintains an associated sequence number, referred to hereinafter as a mobile unit sequence number. In one embodiment, the mobile unit 220 includes a counter (not shown) that stores a current value of the mobile unit sequence number and increments the mobile unit sequence number in response to certain events. For example, the counter may increment the mobile unit sequence number each time the mobile unit 220 establishes a new wireless telecommunications link. In one embodiment, the mobile unit sequence number and, if present, the counter, may reside within a user services identity module (USIM), which may also be referred to as a subscriber identity module (SIM).

The mobile unit 220 is capable of forming an access request using the mobile unit sequence number. As used herein, the term "access request" will be understood to refer to a message provided by the at least one mobile unit 220 that contains information that may be used by the base station and 215 to establish a wireless communication link between the mobile unit 220 and the base station 215. In one embodiment, the access request may be transmitted to initiate a call. For example, the access request may be transmitted by the mobile unit 220 to initiate a call from the cell 210. In another embodiment, the access request may be transmitted during a call. For example, an access request may be transmitted by the mobile unit 220 to establish a wireless telecommunications link with the base station 215 when the mobile unit 220 roams from another cell into the cell 210 during a call.

The access request includes information that may be used to establish a secure wireless telecommunications link. In one embodiment, the mobile unit 220 is configured to use a pre-provisioned root key, a random number, and an authentication management field to form a message authentication code and an anonymity key. For example, the mobile unit 220 may form a message authentication code and the anonymity key using one or more irreversible algorithmic functions. The mobile unit 220 may also be configured to mask the mobile unit sequence number using the anonymity key. For example, the mobile unit 220 may be able to exclusive-or the mobile unit sequence number and the anonymity key. However, in alternative embodiments, the mobile unit 220 may not be configured to mask the mobile unit sequence number.

The mobile unit 220 is also configured to generate an AUTS parameter using the mobile unit sequence number (or the masked mobile unit sequence number) and the message authentication code. In one embodiment, the mobile unit 220 generates the AUTS parameter by concatenating the mobile unit sequence number (or the masked mobile unit sequence number) and the message authentication code. However, in alternative embodiments, the mobile unit sequence number (or the masked mobile unit sequence number) and the message authentication code may be combined in any desirable manner to generate the AUTS parameter. The mobile unit 220 may then use the AUTS parameter to generate the access request. For example, the mobile unit may combine the AUTS parameter with the random number to form the access request.

Furthermore, as discussed above, the access request may include additional information such as an identification number associated with the mobile unit 220, a signal indicative of one or more capabilities of the mobile unit 220, a signal indicative of one or more protocols followed by the mobile unit 220, and the like. However, persons of ordinary skill in the art should appreciate that the present invention is not limited to access requests including the identification number associated with the mobile unit 220, the signal indicative of one or more capabilities of the mobile unit 220, the signal indicative of one or more protocols followed by the mobile unit 220. In alternative embodiments, not all of this information may be provided or additional information may be provided in the access request.

The mobile switching center 205 is communicatively coupled to a home location register 225. As discussed above, the home location register 225 includes information identifying mobile units that are associated with a mobile switching center associated with the home location register 225. However, while the home location register 225 is assumed to include information identifying the mobile unit 220, the home location register 225 is not assumed to be associated with the mobile switching center 205 shown in FIG. 2. Accordingly, the mobile switching center 205 may view the mobile unit 220 as either a "home mobile unit" or a "visitor mobile unit" in the cell 210. In alternative embodiments, the mobile switching center 205 may be directly coupled to the home location register 225 (e.g. when the mobile unit 220 is a home mobile unit) or may be coupled to the home location register 225 through a network that is coupled to another mobile switching center (e.g. when the mobile unit 220 is a visitor mobile unit).

The mobile switching center 205 is also communicatively coupled to a visitor location register 230. As also discussed above, the visitor location register 230 includes information identifying each mobile unit 220 that is currently present within the cell 210, such as a list of home and/or visitor mobile units that are present in the cell 210. For example, if the mobile unit 220 is a home mobile unit, the visitor location register 230 includes information identifying the mobile unit 220 as a home mobile unit. For another example, if the mobile unit 220 is a visitor mobile unit, the visitor location register 230 includes information identifying the mobile unit 220 as a visitor mobile unit and information indicating the location of the home location register 225 associated with the mobile unit 220.

The wireless telecommunication network 200 includes at least one authentication center 235. In the illustrated embodiment, the authentication center 235 operates according to an Authentication and Key Agreement (AKA) protocol as defined by the 3rd Generation Partnership Project (3GPP and/or 3GPP2) to provide user identity confidentiality, user location confidentiality, and user untraceability. However, persons of ordinary skill in the art should appreciate that the present invention is not limited to the Authentication and Key Agreement (AKA) protocol defined by the 3rd Generation Partnership Project. In alternative embodiments, any desirable challenge-response protocol may be used.

As will be discussed in detail below, the authentication center 235 is capable of selecting a sequence number that is acceptable to the mobile unit 220 based upon the mobile unit sequence number included in the access request. For example, if the mobile unit sequence number is 300, the authentication center 235 may select a sequence number of 301. In alternative embodiments, the authentication center 235 may select a range of sequence numbers that are acceptable to the mobile unit 220. For example, if the mobile unit sequence number is 300, the authentication center 235 may select a plurality of sequence numbers ranging sequentially from 301 to 310.

Figure 3:
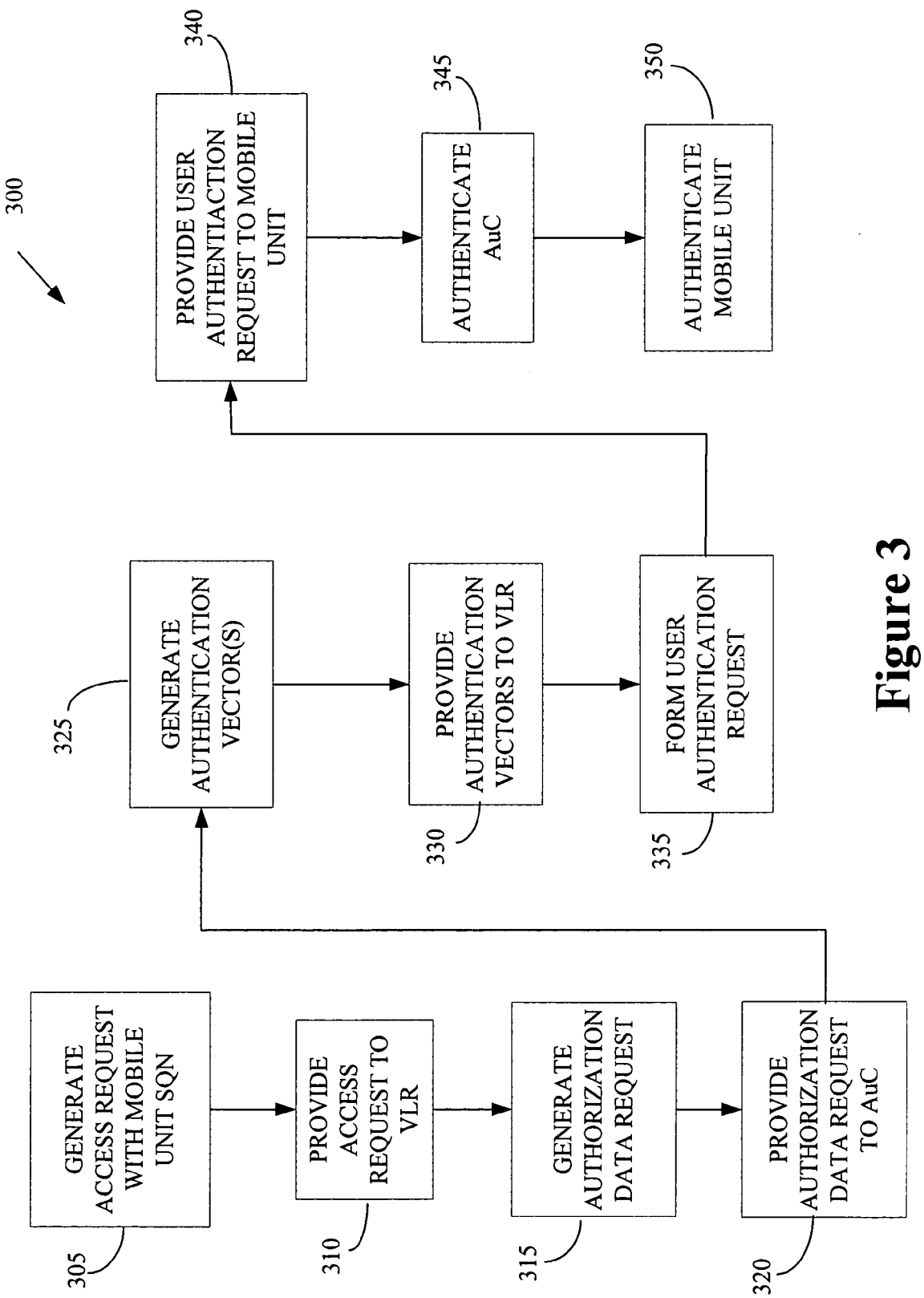
FIG. 3 conceptually illustrates an exemplary embodiment of a method of synchronizing a mobile unit and an authentication center, in accordance with the present invention.

FIG. 3 conceptually illustrates an exemplary embodiment of a method 300 of synchronizing a mobile unit and a wireless telecommunication network. An access request is generated (at 305) using the mobile unit sequence number and then the access request is provided (at 310) to a visitor location register, such as the visitor location register 230 shown in FIG. 2. The visitor location register generates (at 315) a first message based upon the access request. For example, the visitor location register may generate (at 315) an authorization data request including a RAND parameter and an AUTS parameter provided by the mobile unit. The AUTS parameter includes information indicative of the mobile unit sequence number and, in various alternative embodiments, the RAND parameter may include information indicative of a random number, a mobile-unit-maintained ever-increasing counter, a system time (which may be used to prevent potential repeated attacks by a road mobile by checking the course validity of the system time), a hash of a portion of an access request message (which may increase the entropy of the RAND parameter by reducing the size of parameters presented to the authentication center for validation), and the like.

The first message is then provided (at 320) to an authentication center, such as the authentication center 235 shown in FIG. 2. In one embodiment, the visitor location register provides (at 320) the aforementioned authorization data request to a mobile switching center, such as the mobile switching center 205 shown in FIG. 2, which then provides (at 320) the authorization data requested to the authentication center.

The authentication center generates (at 325) a second message based upon the first message. As discussed above, the second message includes information indicative of an authentication center sequence number that is acceptable to the mobile unit. In one embodiment, the second message is an authentication vector formed by the authentication center based upon information included in the authorization data request. For example, the authentication center may use the acceptable authentication center sequence number, a generated RAND parameter, and authentication management function, and a pre-provisioned root key, to form a message authentication code, an expected result, a cipher key, an integrity key, and an anonymity key. The authentication center then generates (at 325) and authentication vector by concatenating the RAND parameter, the expected result, the cipher key, the integrity key, and an authentication token formed using the authentication center sequence number, the anonymity key, the authentication management function, and the message authentication code.

In alternative embodiments, the authentication center may generate (at 325) a plurality of second messages including authentication center sequence numbers that are acceptable to the mobile unit. For example, the authentication center may generate (at 325) a plurality of authentication vectors having a corresponding plurality of authentication center sequence numbers. The plurality of authentication center sequence numbers may be selected randomly from an acceptable range of sequence numbers or, alternatively, they may be a sequential set of sequence numbers selected from the acceptable range of sequence numbers.

The authentication center provides (at 330) the one or more second messages to the visitor location register. In one embodiment, the authentication center provides (at 330) an authentication data response including a plurality of authentication vectors having acceptable authentication center sequence numbers. The visitor location register then forms (at 335) a third message using the at least one second message provided (at 330) by the authentication center. In one embodiment, the visitor location register may also store at least one of the second messages. For example, the visitor location register may store one or more authentication vectors for later use. The third message is then provided (at 340) to the mobile unit. For example, the visitor location register may provide (at 340) a user authentication request including a RAND parameter generated by the authentication center and the authentication token including information indicative of the authentication center sequence number.

The mobile unit authenticates (at 345) the network based upon the third message. In one embodiment, the mobile unit verifies the authentication token provided by the authentication center and then authenticates (at 345) the network if the authentication token is verified. The mobile unit may then compute a result and provide the computed result to the visitor location register in, e.g., a user authentication response. The visitor location register may then authenticate (at 350) the mobile unit based upon the computed result. For example, the visitor location register may compare the computed result to the expected result determined by the authentication center and authenticate (at 350) the mobile unit if they expected result is equal to the computed result.

By providing the mobile unit sequence number in the access request, as described above, the present invention may reduce the probability that a conventional re-synchronization process will be needed because the mobile unit will properly inform the network about acceptable values of a sequence numbers that will be received in the incoming authentication vector. Thus, the present may reduce the strain of numerous re-synchronization requests on network resources, as well as reducing the authentication cycle.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of wireless communication with at least one mobile unit and at least one authentication center, the method comprising:
   generating at least one access request including information indicative of at least a first sequence number associated with the mobile unit, the first sequence number corresponding to an authentication vector; and
   receiving at least one message based upon the access request, the message comprising at least a second sequence number selected by the authentication center, the second sequence number selected to be acceptable to the mobile unit based on the first sequence number indicated by said at least one access request so that the second sequence number used by the authentication center is synchronized with the first sequence number used by the mobile unit.

2. The method of claim 1, wherein generating the access request including information indicative of the first sequence number comprises combining the first sequence number and an anonymity key.

3. The method of claim 2, wherein combining the first sequence number and the anonymity key comprises masking the first sequence number by performing an exclusive-or operation on the first sequence number and the anonymity key.

4. The method of claim 3, wherein generating the access request including information indicative of the first sequence number comprises generating a message authentication code.

5. The method of claim of 4, wherein generating the message authentication code comprises generating the message authentication code based upon a pre-provisioned root key, an authentication management field, and at least one of a random number, a mobile-unit-maintained ever-increasing counter, the system time, and a hash of a portion of an access request message.

6. The method of claim 4, wherein generating the access request comprises concatenating the message authentication code and the masked first sequence number.

7. The method of claim 1, wherein providing the access request to the authentication center comprises providing the message to a visitor location register.

8. The method of claim 1, wherein receiving the message including the second sequence number comprises receiving an authentication vector formed based upon the second sequence number.

9. The method of claim 8, wherein receiving the authentication vector comprises receiving an authentication token formed based upon the second sequence number.

10. The method of claim 1, wherein receiving the message having the second sequence number acceptable to the mobile unit comprises receiving the message having a second sequence number that is larger than the first sequence number.

11. The method of claim 1, wherein receiving the message having the second sequence number acceptable to the mobile unit comprises receiving the message having a second sequence number in an acceptable range of sequence numbers.

12. The method of claim 1, comprising verifying that the message was provided by the authentication center.

13. The method of claim 1, comprising:
   computing a result based upon the second message; and
   providing the result to the authentication center.

14. A method of wireless communication with at least one mobile unit and at least one authentication center, the method comprising:
   receiving at least one access request formed including information indicative of at least a first sequence number associated with the mobile unit, the first sequence number corresponding to an authentication vector; and
   providing at least one message based upon the access request, the message including at least a second sequence number selected by the authentication center, and the second sequence number being selected to be acceptable to the mobile unit based on the first sequence number indicated by said at least one access request so that the second sequence number used by the authentication center is synchronized with the first sequence number used by the mobile unit.

15. The method of claim 14, wherein receiving the access request comprises receiving the access request including the first sequence number, the first sequence number being masked using an authenticity key.

16. The method of claim 15, comprising determining the first sequence number based upon the masked first sequence number and the authenticity key.

17. The method of claim 14, wherein providing the message having the second sequence number that is acceptable to the mobile unit comprises providing the message having a second sequence number that is larger than the first sequence number.

18. The method of claim 14, wherein providing the message having the second sequence number that is acceptable to the mobile unit comprises providing the message having a second sequence number in an acceptable range of sequence numbers.

19. The method of claim 14, wherein providing the message having the second sequence number that is acceptable to the mobile unit comprises providing a plurality of messages having a plurality of second sequence numbers that are acceptable to the mobile unit.

20. The method of claim 19, wherein providing the plurality of second messages having the plurality of second sequence numbers that are acceptable to the mobile unit comprises providing the plurality of messages having a sequential plurality of second sequence numbers that are acceptable to the mobile unit.

21. The method of claim 14, wherein providing the message comprises providing the message to a visitor location register.

22. A method of wireless communication with at least one mobile unit and at least one authentication center, the method comprising:
    receiving at least one access request including information indicative of at least a first sequence number associated with the mobile unit, the first sequence number corresponding to an authentication vector;
    providing at least a first message based upon the access request; and
    receiving, in response to providing the first message, at least a second message including at least a second sequence number selected by the authentication center, the second sequence number selected to be acceptable to the mobile unit based on the first sequence number indicated by said at least one access request so that the second sequence number used by the authentication center is synchronized with the first sequence number used by the mobile unit.

23. The method of claim 22, wherein providing the first message comprises providing an authentication data request to the authentication center, and wherein receiving the second message comprises receiving at least one authentication vector, and further comprising providing a user authentication request to the mobile unit.

24. The method of claim 22, comprising storing at least a portion of the second message.

25. The method of claim 22, comprising determining an expected result based upon the second message.

26. The method of claim 25, comprising receiving a third message including a result formed based upon the second message.

27. The method of claim 26, comprising:
    comparing the result and the expected result; and
    authenticating the mobile unit and the authentication center if the result is equal to the expected result.

* * * * *